United States Patent
Haraguchi et al.

(10) Patent No.: US 7,695,852 B2
(45) Date of Patent: Apr. 13, 2010

(54) MANUFACTURING CONTROL METHOD FOR RECHARGEABLE BATTERY

(75) Inventors: Kazunori Haraguchi, Osaka (JP); Fumio Daio, Osaka (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 11/442,425

(22) Filed: May 30, 2006

(65) Prior Publication Data

US 2006/0267550 A1     Nov. 30, 2006

(30) Foreign Application Priority Data

May 30, 2005    (JP)   ............... 2005-156946

(51) Int. Cl.
*H01M 10/48*     (2006.01)
(52) U.S. Cl. ...................................... 429/92
(58) Field of Classification Search ................. 320/132, 320/112, 109; 702/63, 183; 429/90, 92
See application file for complete search history.

(56) References Cited

U.S. PATENT DOCUMENTS 5,955,869 A * 9/1999 Rathmann ................... 320/132
6,404,335 B1 * 6/2002 Ohno et al. .................. 340/505
7,003,431 B2 * 2/2006 Quint et al. .................. 702/183
2004/0196006 A1 * 10/2004 Kawaguchi et al. ......... 320/132

FOREIGN PATENT DOCUMENTS

| CN | 1543197 A | 11/2004 |
|---|---|---|
| JP | 2001-015178 | 1/2001 |

OTHER PUBLICATIONS

Chinese Office Action issued in Chinese Patent Application No. CN 2006100842575 dated Dec. 19, 2008.

* cited by examiner

*Primary Examiner*—Bao Q Vu
*Assistant Examiner*—Jue Zhang
(74) *Attorney, Agent, or Firm*—McDermott Will & Emery LLP

(57) ABSTRACT

IC tags are installed in rechargeable batteries and then information required for manufacturing control of the rechargeable batteries or information required to produce battery packs which use rechargeable batteries is recorded onto the IC tags. Allowing the information recorded onto the IC tags to be rewritten makes it possible to search for the causes of occurring problems as well as make the best use of improvements to the rechargeable batteries when information during use of the rechargeable batteries is recorded after the rechargeable batteries are manufactured and shipped.

7 Claims, 2 Drawing Sheets

MANUFACTURING CONTROL METHOD FOR RECHARGEABLE BATTERY

The present disclosure relates to subject matter contained in priority Japanese Patent Application No. 2005-156946, filed on May 30, 2005, the contents of which is herein expressly incorporated by reference in its entirety.

BACKGROUND OF THE INVENTION

1. Field of the Invention

The present invention relates to a manufacturing control method for a rechargeable battery that records information required for manufacturing and/or during use of a rechargeable battery onto an IC tag installed in a rechargeable battery and then use this information for manufacturing a battery pack consisting of a combination of a plurality of rechargeable batteries. In addition, the manufacturing control method for a rechargeable battery also supplies history information of used rechargeable batteries to the analysis of problems.

2. Description of the Related Art

Even with the same type of battery there are variations in the characteristics of the manufactured batteries due to the condition of the manufacturing equipment, variations in the materials used, and environmental changes such as temperature and humidity. In particular, variations in battery characteristics become greater due to a charge/discharge process since rechargeable batteries are charged and discharged during the manufacturing process. Variations in battery characteristics become especially noticeable when using a plurality of rechargeable batteries to produce a battery power source device such as a battery pack. In other words, if there are variations in the characteristics of a combination of a plurality of rechargeable batteries, the charge quantity will be regulated to the level of a low performance rechargeable battery and the utilization rate of the battery capacity will decrease due to a plurality of rechargeable batteries. Therefore, when using a combination of a plurality of rechargeable batteries such as a battery pack, the battery characteristics must be completely identical.

After the assembly process completes in the manufacturing process of a rechargeable battery, the battery is discharged until reaching the final discharge voltage after being fully charged in the charge and discharge process. The battery capacity is calculated using the sustained discharge time at that moment. Batteries with a battery capacity at a specified value are partially charged to a specified charge quantity and then manufactured and shipped as conforming batteries. There are still variations in the battery characteristics of the rechargeable batteries due to variations in the charge quantity during the partial charge as well as variations in the environmental temperature during the charge. If a battery pack is produced using a combination of a plurality of rechargeable batteries that have this type of variation in the battery characteristics, a battery pack with the uniform performance as described above cannot be obtained.

Thereupon, a measurement device (Japanese Patent Publication No. 2001-015178) is known that individually evaluates manufactured and shipped rechargeable batteries, selects batteries with closely analogous battery characteristics, and then supplies these to the manufacture of battery packs that use a plurality of rechargeable batteries. This conventional technology measures the open circuit voltage of a plurality of the partially charged rechargeable batteries, selects the batteries whose open circuit voltage differences are within a specified range as batteries with almost equal partially charged quantities, and then produces battery packs using these rechargeable batteries.

However, the technology disclosed in Japanese Patent Publication No. 2001-015178 presumes a partial charge quantity from the open circuit voltage of the rechargeable battery. Because of this, when the open circuit voltage has changed due to factors other than the partial charge quantity, it is not possible to know the fact. This results in the risk of the characteristics of a plurality of rechargeable batteries constituting a battery pack not being identical. The manufacture of a battery pack is not always performed by a battery manufacturer and much effort is required for battery pack manufacturers who receive supplies of manufactured and shipped rechargeable batteries to inspect the battery characteristics for a large number of rechargeable batteries using test equipment and then select and sort the battery characteristics into identical rechargeable batteries.

In addition, since the performance of the batteries largely depends on the operating conditions, analyzing the usage history of the batteries and extracting problem points is important for battery development and applications to new battery fields. It is not possible to find detailed usage history from rechargeable batteries that have been recycled.

BRIEF SUMMARY OF THE INVENTION

In view of the foregoing conventional problems, it is an object of the present invention to provide a manufacturing control method for batteries that records information for manufacturing rechargeable batteries and/or during use of rechargeable batteries onto individual rechargeable batteries and then use this recorded information for the selection of rechargeable batteries and the analysis of usage histories.

In order to achieve the above object, the manufacturing control method for a rechargeable battery according to a first aspect of the present invention comprises: writing information required during a battery manufacturing process to an IC tag installed in a rechargeable battery; reading the information from the IC tag during a battery inspection process; and performing manufacturing control of the rechargeable battery based on the information read out. If information during the manufacturing process is recorded onto individual rechargeable batteries, it is possible to easily search for the causes of problems during manufacture when nonconforming batteries frequently occur during the inspection process.

Accurate manufacturing controls are implemented such as searching for problems during manufacture from information read from the information recorded onto the above IC tag. This information includes electrode plate assembly production machine numbers, electrode plate assembly production dates, electrolyte immersion dates, manufacturing line numbers, sealing dates, initial charge and discharge dates, aging date and length of aging, and shipment charge dates.

Furthermore, in order to achieve the above object, the manufacturing control method for a rechargeable battery according to a second aspect of the present invention comprises: writing information required during a battery manufacturing process to an IC tag installed in a rechargeable battery; reading the information from the IC tag at an arbitrary location for manufactured and shipped rechargeable batteries; and evaluating or sorting the rechargeable battery based on the information read out. If information during the manufacturing process is recorded onto individual rechargeable batteries, it is possible to easily implement operations such as ideally evaluating rechargeable batteries from the information recorded on individual rechargeable batteries and combining a plurality of rechargeable batteries into groups that have identical battery characteristics when using manufactured and shipped rechargeable batteries to produce battery packs.

Operations to select and sort rechargeable batteries into groups that have identical battery characteristics are easily implemented when using multiple combinations of manufactured and shipped rechargeable batteries to produce battery packs by selecting information recorded on IC tags from among battery capacity and/or shipment charge quantity and/or open circuit battery voltage at shipment and/or manufacturing date.

Even further, in order to achieve the above object, the manufacturing control method for a rechargeable battery according to a third aspect of the present invention comprises: writing information required during a battery manufacturing process and information required during use of a battery to an IC tag installed in a rechargeable battery; reading the information from the IC tag as necessary; and analyzing problems during manufacture or during use of the rechargeable batteries based on the information read out. If information during the manufacturing process is recorded onto individual rechargeable batteries, it is possible to easily search for the causes of problems during manufacture when nonconforming batteries frequently occur during the inspection process. It is also possible to easily implement operations such as ideally evaluating rechargeable batteries from the information recorded on individual rechargeable batteries and combining a plurality of rechargeable batteries into groups that have identical battery characteristics when using manufactured and shipped rechargeable batteries to produce battery packs. In addition, recording information during use of a battery is effective to analyze the cause of problems when troubles occur, allowing the best use of improvements to and new developments of rechargeable batteries.

When the recording capacity in the IC tag is small in the configuration described above, a wide range of information is recorded by rewriting, at an arbitrary location, the information which is required for the battery manufacturing process and is recorded on the IC tag with the information required during use of a battery.

Not allowing the information written to the IC tags in each of the aspects of the invention described above to be rewritten makes it possible to prevent disorder due to the recorded information being rewritten. In contrast, allowing the information written to the IC tags to be rewritten under certain conditions makes it possible to only record required information onto IC tags with a small recording capacity. The use of a code key for a rewrite as a condition that allows rewriting will prevent idle rewrites.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

In the following an embodiment of the present invention will be described with reference to FIG. 1 and FIG. 2. The embodiment is one example embodying the present invention but does not limit the technical scope of the present invention.

Figure 1:
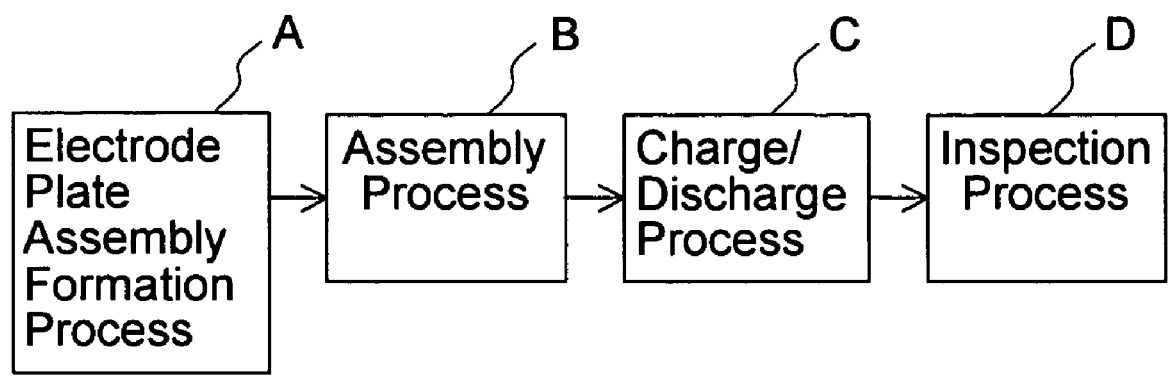
FIG. 1 is a block diagram showing an outline of the manufacturing process of a rechargeable battery of the present invention.
Figure 2:
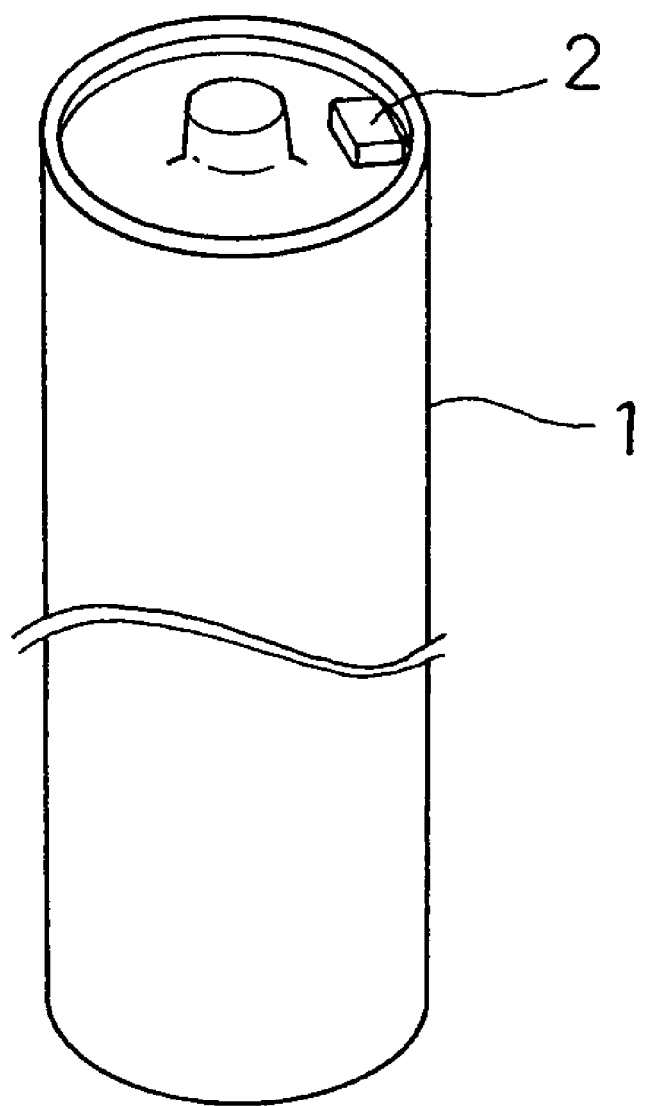
FIG. 2 is a perspective view showing an example of an IC tag installed in a rechargeable battery of the present invention.

FIG. 1 shows an outline of the manufacturing process of a rechargeable battery. Portions of the manufacturing process differ depending on the type and construction of the rechargeable battery. This example shows a cylindrical lithium ion rechargeable battery.

In electrode plate assembly formation process A, an electrode plate assembly is formed by winding a positive electrode plate and a negative electrode plate, which are formed to a specified length by an electrode plate formation device, with a separator interposed therebetween, until reaching a specified diameter. In assembly process B, the electrode plate assembly is housed inside a battery case and a positive electrode lead and a negative electrode lead, which are both drawn from the positive electrode plate and the negative electrode plate, are connected to a sealing plate and the battery case, respectively. Thereafter, electrolyte is injected inside the battery case and the electrolyte is sufficiently impregnated into the electrode plate assembly by an impregnation action that draws a vacuum. As a result, the battery case is filled with a specific quantity of electrolyte. After this, the opening of the battery case is sealed by the sealing plate and a structural composition of a rechargeable battery is obtained.

In charge/discharge process C, as an initial charge the structurally complete rechargeable battery is charged until it is fully charged. Completely charged rechargeable batteries are then discharged until reaching a final discharge voltage and the battery capacity is calculated from the sustained discharge time. In inspection process D, the battery capacity and the battery voltage after charging, the internal resistance, and the insulation resistance are inspected. Batteries that are within a specified range are conforming batteries. These batteries are then charged up to a specified charge quantity as a shipment charge, manufactured and shipped.

Rechargeable batteries manufactured and shipped through the manufacturing process described above have variations in the battery characteristics due to states such as the raw material lot, electrode plate formation device, process line, electrolyte immersion, and charge/discharge as well as conditions such as temperature and humidity. The variations in the battery characteristics when using a single rechargeable battery are within a fixed range. Because of this, the required battery performance is obtained. When using a plurality of rechargeable batteries to produce a single battery pack however, the characteristics of the rechargeable batteries that constitute the single battery pack must be identical. Therefore, operations to select batteries with identical characteristics from among a large number of rechargeable batteries is indispensable.

The manufacturing method of a battery in this embodiment makes it possible to record information that allows the battery characteristics in each rechargeable battery to be known. As shown in FIG. 2, the IC tag 2 is installed in the structurally complete rechargeable battery 1 in order to record information of each rechargeable battery. Information required during the manufacturing process, such as electrode plate assembly production machine numbers, electrolyte immersion dates, and battery capacity, is recorded onto this IC tag 2. If electrical information, such as battery capacity and battery voltage, is recorded onto the IC tag 2, it is easy to sort and select batteries with identical battery characteristics by using a reader to read the information from each rechargeable battery 1. In addition, battery packs that have required performance are produced by using a plurality of selected rechargeable batteries to produce a single battery pack.

If information such as electrode plate assembly production machine numbers, manufacturing line numbers, electrolyte immersion dates, sealing dates, and charge/discharge dates is recorded onto the IC tag 2, it is possible to search for the causes of problems of increased nonconforming batteries by reading the information from the IC tags 2 of the nonconforming rechargeable batteries 1 when the variation range of the battery characteristics becomes larger or when the number of occurrences of defects increases in inspections of completed rechargeable batteries 1. For example, if it can be found based on information of the IC tags 2 of the nonconforming rechargeable batteries that there are many occurrences of nonconforming batteries in the rechargeable batteries 1 that use the electrode plate assembly produced by a specific electrode plate assembly production machine, it is natural to assume a problem with that electrode plate assembly production machine. Consequently, adjustments and repairs are made to the applicable electrode plate assembly production machine from the electrode plate assembly production machine number contained in the information, thereby making it possible to implement corresponding countermeasures before there is a large occurrence of nonconforming batteries.

Information related to the manufacturing of the batteries recorded onto the IC tag installed in the rechargeable batteries 1 is not required when the rechargeable battery 1 will be introduced into the market in a form such as a single battery or a battery pack. Although this is the case, in a system that records battery information onto a battery pack and then utilizes that information, such as a smart battery system in a mobile computer, reading the information from the IC tag 2 makes it possible to easily obtain information required for the system. For example, information such as the manufacturer of the battery and battery pack, the manufacturing date, the manufacturing number, battery capacity, and battery voltage is recorded onto battery packs applied to a smart battery system. If, however, this information is recorded onto the IC tag 2, it is read and transferred to a microcomputer or a memory installed in a battery pack.

Using a rewritable Flash memory as the memory device installed in the IC tag 2 makes it possible to rewrite the information related to the manufacturing of the batteries with information during use of a battery after the rechargeable battery 1 has been introduced into the market. For instance, data such as the maximum discharge current, maximum charge voltage and current, number of charges/discharges, and temperature environment of the rechargeable battery 1 are written and rewritten by providing a non-contact data writing device (writer) for the IC tag 2 in a battery pack.

When a problem occurs in the rechargeable battery 1 or a battery pack that uses the rechargeable battery 1, information during battery use that has been recorded onto each rechargeable battery 1 will be the information important to analyze the cause of the problem. Analyzing the information during battery use that has been recorded onto the IC tag 2 makes it possible to search for the causes of problems as well as make the best use of improvements to the rechargeable battery 1 if the rechargeable battery 1 or a battery pack that uses the rechargeable battery 1 is repaired, replaced, or spent and then recycled.

Although analyzing the usage history of the batteries and extracting problem points is important for battery development and applications to new battery fields, analyzing the usage history of a recycled rechargeable battery 1 makes it possible to obtain information such as users or the use of applicable devices and operating tendencies or improvements to batteries.

According to the present invention as described above, since it is possible to record and control information required for manufacturing and/or during use onto individual rechargeable batteries, the recorded information is effectively utilized while using rechargeable batteries that underwent manufacturing control or manufactured and shipped rechargeable batteries to produce a rechargeable battery such as a battery pack. This is effective to produce rechargeable batteries or battery packs with consistent quality. Furthermore, recording information required when a rechargeable battery is being used makes it possible to analyze the cause of problems when troubles occur as well as make the best use of improvements to rechargeable batteries or developments of new batteries.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A manufacturing control method for a rechargeable battery, comprising:

writing information required during a battery manufacturing process into an IC tag installed in the rechargeable battery by using a non-contact writing device;

reading the information from the IC tag during a battery inspection process; and performing manufacturing control of the rechargeable battery based on the information read out, wherein:

the rechargeable battery comprises a plurality of rechargeable batteries, each of which is provided with the IC tag, and the method further includes selecting and sorting the rechargeable batteries into groups that have identical battery characteristics based on the information recorded in the IC tag, and the information recorded into the IC tag is at least one selected from the group consisting of an electrode plate assembly production machine number, an electrode plate assembly production date, an electrolyte immersion date, a manufacturing line number, a sealing date, an initial charge and discharge date, and an aging date and length of aging.

2. The manufacturing control method for a rechargeable battery according to claim 1, wherein the information written into the IC tag is not allowed to be rewritten.

3. The manufacturing control method for a rechargeable battery according to claim 1, wherein the information written into the IC tag is allowed to be rewritten under a certain condition.

4. A manufacturing control method for a rechargeable battery, comprising:

writing information required during a battery manufacturing process into an IC tag installed in the rechargeable battery by using a non-contact writing device;

reading the information from the IC tag during a battery inspection process; and performing manufacturing control of the rechargeable battery based on the information read out, wherein:

the information recorded onto the IC tag is one selected from the group consisting of a battery capacity, a shipment charge quantity, an open circuit battery voltage at shipment, and a manufacturing date, the rechargeable battery comprises a plurality of rechargeable batteries, each of which is provided with the IC tag, and the method further includes selecting and sorting the rechargeable batteries into groups that have identical battery characteristics based on battery characteristic information recorded onto the IC tag.

5. The manufacturing control method for a rechargeable battery according to claim 1, wherein the information which is required for the battery manufacturing process and is recorded into the IC tag is rewritten at an arbitrary location with the information required during use of the rechargeable battery.

6. The manufacturing control method for a rechargeable battery according to claim 1, further comprising assembling the rechargeable battery.

7. The manufacturing control method for a rechargeable battery according to claim 1, wherein the IC tag is installed in the structurally complete rechargeable battery in order to record information of each rechargeable battery.

* * * * *